(12) United States Patent
Ichi

(10) Patent No.: US 11,764,573 B2
(45) Date of Patent: Sep. 19, 2023

(54) DC POWER SUPPLY SYSTEM

(71) Applicant: TDK Corporation, Tokyo (JP)

(72) Inventor: Masao Ichi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 209 days.

(21) Appl. No.: 17/434,270

(22) PCT Filed: Feb. 28, 2019

(86) PCT No.: PCT/JP2019/007746
§ 371 (c)(1),
(2) Date: Aug. 26, 2021

(87) PCT Pub. No.: WO2020/174641
PCT Pub. Date: Sep. 3, 2020

(65) Prior Publication Data
US 2022/0140600 A1 May 5, 2022

(51) Int. Cl.
*H02J 1/10* (2006.01)
*H02J 7/34* (2006.01)

(52) U.S. Cl.
CPC .............. *H02J 1/10* (2013.01); *H02J 7/34* (2013.01); *H02J 2300/22* (2020.01); *H02J 2300/28* (2020.01)

(58) Field of Classification Search
CPC ...... H02J 1/00; H02J 1/10; H02J 1/102; H02J 7/34; H02J 3/38
See application file for complete search history.

(56) References Cited

U.S. PATENT DOCUMENTS

| | | | |
|---|---|---|---|
| 9,667,040 B2 | 5/2017 | Fujita et al. | |
| 9,985,842 B2 | 5/2018 | White | |
| 2003/0231003 A1* | 12/2003 | Ballard | H02J 7/007194 320/116 |
| 2011/0273022 A1* | 11/2011 | Dennis | H02J 7/34 307/72 |

(Continued)

FOREIGN PATENT DOCUMENTS

| | | |
|---|---|---|
| JP | 2001-069688 A | 3/2001 |
| JP | 2016-082666 A | 5/2016 |

OTHER PUBLICATIONS

International Search Report issued in PCT/JP2019/007746, dated May 14, 2019 w/English Translation.

*Primary Examiner* — Rexford N Barnie
*Assistant Examiner* — Rasem Mourad
(74) *Attorney, Agent, or Firm* — McDermott Will & Emery LLP

(57) ABSTRACT

A DC power supply system includes: nodes to connect to a DC bus and constitute a DC grid with the bus; a power management apparatus that manages the power demand of the entire grid; and a starter device that makes the nodes start up and connect to the bus one by one in an order in a state where the bus is down to start up the entire grid. The starter device supplies start-up power through a power supply line to start up each node. The starter device diagnoses nodes to be diagnosed selected from among the nodes before supply of the power to determine the abnormality from a response with respect to a diagnostic signal supplied to the nodes through the start-up power supply line. When the node diagnosed is determined to be normal, the starter device supplies the start-up power thereto and connects it to the bus.

9 Claims, 3 Drawing Sheets

(56) References Cited

U.S. PATENT DOCUMENTS

2017/0207652 A1    7/2017  Morita
2021/0041507 A1*   2/2021  Eliassen ................. G01R 31/52
2021/0206290 A1*   7/2021  Li ........................... B60L 58/14

* cited by examiner

DC POWER SUPPLY SYSTEM

CROSS REFERENCE TO RELATED APPLICATIONS

This application is the U.S. National Phase under 35 U.S.C. § 371 of International Application No. PCT/JP2019/007746, filed on Feb. 28, 2019, the entire contents of which are hereby incorporated by reference.

TECHNICAL FIELD

The present invention relates to a DC power supply system and, more particularly, to a DC power supply system constituted by combining a natural energy power generator such as a solar power generator, and a storage battery.

BACKGROUND ART

Various power storage devices have recently been developed along with progress of power electronics technology. The surplus power of natural energy obtained by, e.g., a solar power generator or a wind turbine generator is charged in a power storage device such as a storage battery or an electric double layer capacitor, and the charged power is discharged as needed. The thus configured power storage device includes a switching power supply unit for controlling power charge/discharge, such as a converter or an inverter.

In regions having no power transmission facilities, such as isolated islands, stand-alone power generation facilities are required for power supply, and thus, power supply by natural energy is expected. However, the natural energy is susceptible to natural environmental conditions and thus significantly fluctuates, so that a power storage device needs to be introduced so as to suppress the fluctuation in power supply. To suppress such a fluctuation in power supply, it is necessary to adjust power demand-supply balance between a power generation source and a load and, to this end, there is required a DC power supply system having a function of controlling a storage battery, a switching power supply, and the like connected to a power supply bus line.

Regarding a DC power supply system, for example, Patent Document 1 describes a power route information generating device including a voltage change information acquisition part for acquiring information on a voltage change in each node connected to a DC bus line and a route information generation part for generating topology information in each node based on the voltage change information in each node acquired by the voltage change information acquisition part.

Further, Patent Document 2 describes the following charging method. Power generated by a solar power generator is once stored in an electric double layer capacitor, followed by charging of a plurality of storage batteries. Then, when at least one of a plurality of storage batteries belonging to a battery group to be charged is fully charged, the fully charged storage battery is excluded from the battery group to be charged, and then storage batteries belonging to a battery group not to be charged are sequentially selected and charged. In this way, charging of all the storage batteries is performed.

CITATION LIST

Patent Document

[Patent Document 1] JP 2016-082666A
[Patent Document 2] JP 2001-069688A

DISCLOSURE OF THE INVENTION

Problem to be Solved by the Invention

Assuming that, in a DC power supply system, power supply from a solar power generator is stopped and a storage battery is empty, the entire DC power supply system constituting a DC grid is down. A so-called stand-alone DC power supply system that does not receive power supply from a commercial power system allows a system down due to power shortage and is configured to be restored when power generation of the solar power generator is resumed.

However, when nodes perform power transmission/reception with a DC bus immediately after the start-up of the DC grid, safety may be impaired.

It is therefore an object of the present invention to provide a DC power supply system capable of safely connecting nodes to a DC bus upon start-up of a DC grid.

Means for Solving the Problem

To solve the above problem, a DC power supply system according to the present invention includes: a DC bus serving as a bus bar for DC power supply; a plurality of nodes configured to connect to the DC bus each through a node connection switch and constitute a DC grid together with the DC bus; a power management apparatus that manages the power demand of the entire DC grid including the plurality of nodes; and a starter device that makes the plurality of nodes start up and connect to the DC bus one by one in a preset order in a state where the DC bus is down to start up the entire DC grid including the DC bus. The starter device supplies start-up power through a start-up power supply line to start up the plurality of nodes and then controls the node connection switch to connect the plurality of nodes to the DC bus. The starter device diagnoses at least one node to be diagnosed selected from among the plurality of nodes before supply of the start-up power to determine the presence/absence of abnormality from a response with respect to a diagnostic signal which is supplied to the node to be diagnosed through the start-up power supply line. When the node to be diagnosed is determined to be normal, the starter device supplies the start-up power thereto and connects it to the DC bus; when the node to be diagnosed is determined to be abnormal, the starter device suspends supply of the start-up power and connection to the DC bus.

According to the present invention, it is possible to prevent the occurrence of accidents due to immediate power transmission/reception between the nodes and the DC bus and to safely start up the DC grid. Further, the diagnostic signal is supplied using the start-up power supply line for use in starting up the nodes, allowing the diagnosis to be performed without use of a special device and a dedicated line.

In the present invention, the starter device preferably includes a start-up power storage. Preferably, the starter device receives power supply from the DC bus during activation of the DC bus to charge the start-up power storage, disconnects the start-up power storage from the DC bus in preparation for down of the DC bus, and uses the power that has been stored in the start-up power storage during the down of the DC bus for operation of the starter device and start-up of the plurality of nodes. Thus, even a stand-alone DC power supply system can stably supply the start-up power to the nodes upon restart of the DC grid.

In the present invention, the starter device preferably starts the start-up of the plurality of nodes upon receiving a DC grid start-up command signal. In this case, the power management apparatus preferably outputs the start-up command signal after detecting that the DC grid shifts from a stop state to a startable state. Alternatively, the starter device may start diagnosing the node to be diagnosed after elapse of a predetermined period of time from the down of the DC bus. With this configuration, it is possible to start up the nodes and diagnose the specific nodes to be diagnosed at an appropriate timing.

In the present invention, the starter device preferably notifies the power management apparatus of the results of the diagnosis for the nodes to be diagnosed. This allows the power management apparatus to manage the power demand with abnormal nodes excluded.

In the present invention, the plurality of nodes preferably includes a power generator including a natural energy power generator, at least one power storage device connected to the DC bus through a bidirectional DC-DC converter and at least one load device. The nodes to be diagnosed preferably include at least the power storage device. The power management apparatus preferably controls the DC grid including the bidirectional DC-DC converter such that it compares the amount of power generated by the power generator and the amount of power consumed by the load device, charges the power storage device with the surplus power when the power generation amount exceeds the power consumption amount, and discharges the power storage device to supplement the deficiency of power when the power consumption amount exceeds the power generation amount. With this configuration, it is possible to safely start up the nodes in a stand-alone DC power supply system utilizing natural energy.

In the present invention, the starter device is preferably incorporated in the power management apparatus.

Alternatively, the starter device may be provided independently of the power management apparatus. In either case, the DC power supply system according to the present invention can safely start up the nodes.

Advantageous Effects of the Invention

According to the present invention, there can be provided a DC power supply system capable of safely connecting nodes to a DC bus upon start-up of a DC grid.

BRIEF DESCRIPTION OF THE DRAWINGS

FIGS. 3A and 3B are views for explaining operation when the starter device starts up the power storage device 50A, wherein FIG. 3A illustrates an operation when the starter device supplies the diagnostic signal to the power storage device, and FIG. 3B illustrates an operation when the starter device supplies the start-up power to the power storage device.

MODE FOR CARRYING OUT THE INVENTION

Hereinafter, a preferred embodiment of the present invention will be described in detail with reference to the accompanying drawings.

Figure 1:
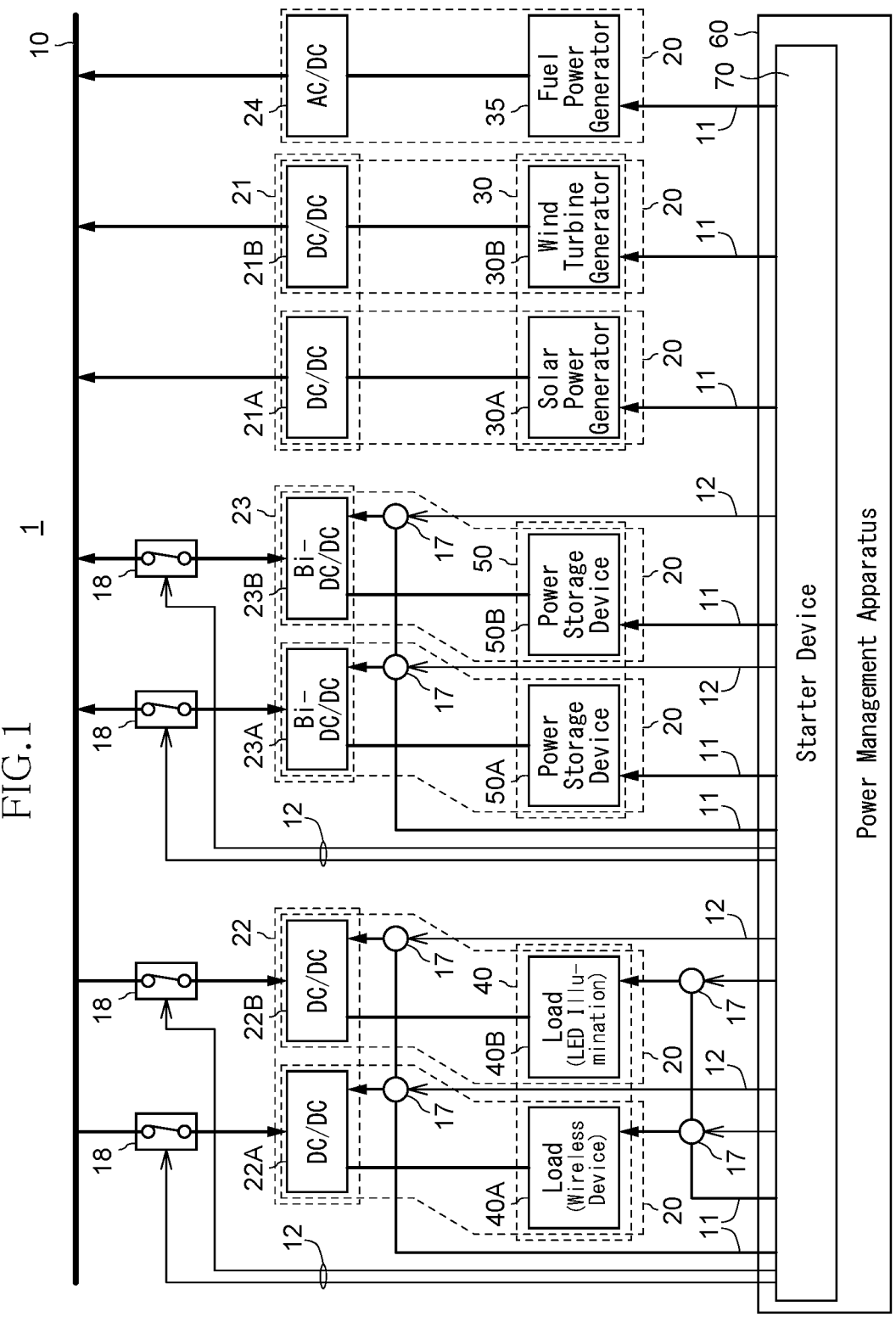
FIG. 1 is a block diagram schematically illustrating the configuration of a DC power supply system according to an embodiment of the present invention.

FIG. 1 is a block diagram schematically illustrating the configuration of a DC power supply system according to an embodiment of the present invention.

As illustrated in FIG. 1, a DC power supply system 1 according to the present embodiment includes a DC bus 10 serving as a bus bar for DC power supply, DC-DC converters 21 to 23 connected to the DC bus 10, a natural energy power generator 30 connected to the DC bus 10 through the DC-DC converter 21, a load device 40 connected to the DC bus 10 through the DC-DC converter 22, a power storage device 50 connected to the DC bus 10 through the DC-DC converter 23, and a power management apparatus 60 that manages the entire system including operations of the DC-DC converters 21 to 23 such that it compares the amount of power generated by the natural energy power generator 30 and the amount of power consumed by the load device 40, charges the power storage device 50 when the power generation amount exceeds the power consumption amount, and discharges the power storage device 50 when the power consumption amount exceeds the power generation amount.

The natural energy power generator 30, load device 40, and power storage device 50 constitute a DC grid together with the DC bus 10. The natural energy power generator 30 and its corresponding DC-DC converter 21, the load device 40 and its corresponding DC-DC converter 22, and the power storage device 50 and its corresponding DC-DC converter 23 each constitute a node 20. In the present embodiment, the load device 40 and power storage device 50 are each connected to the DC bus 10 through a node connection switch 18, and the node connection switch 18 is controlled by the power management apparatus 60. That is, these nodes 20 can each be disconnected from the DC bus 10 under the control of the power management apparatus 60.

The DC bus 10 is a high-voltage DC transmission line of, e.g., 350±100 V. Thus, when a device operating at a voltage lower than 350±100 V is connected to the DC bus 10, it needs to be connected thereto through a DC-DC converter. The DC-DC converter 21 is a unidirectional DC-DC converter (step-up converter) that steps up a power of, e.g., 240 V from the natural energy power generator 30 to 350 V and supplies the resultant power to the DC bus 10. The DC-DC converter 22 is a unidirectional DC-DC converter (step-down converter) that steps down a power of 350 V on the DC bus 10 to 24 V and supplies the resultant power to the load device 40. The DC-DC converter 23 is a bidirectional DC-DC converter that steps down or steps up a power on the DC bus 10 and supplies the resultant power to the power storage device 50, as well as steps up or steps down a power from the power storage device 50 and supplies the resultant power to the DC bus 10. The DC-DC converters 21 to 23 have an ON/OFF command reception function and a power amount regulation command reception function and are configured to communicate with the power management apparatus 60.

The natural energy power generator 30 is, for example, a solar power generator 30A and a wind turbine generator 30B. In the present embodiment, the solar power generator 30A includes a solar panel and a power conditioner and is connected to the DC bus 10 through a DC-DC converter 21A. The wind turbine generator 30B includes a generator main body and a power conditioner and is connected to the DC bus 10 through a DC-DC converter 21B. The DC-DC converters 21A and 21B may each be incorporated in its corresponding power conditioner. The power conditioner has a MPPT (Maximum Power Point Tracking) function, an ON/OFF command reception function, a power amount regulation command reception function, a power generation information transmission function, and the like and is configured to communicate with the power management apparatus 60. Although the type and the number of the natural energy power generators 30 to be connected to the DC bus 10 are not particularly limited, the solar power generator 30A is preferably provided as the natural energy power generator 30. The power generated by the solar power generator 30A and wind turbine generator 30B is supplied to the load device 40 and power storage device 50 through the DC bus 10.

Although the natural energy power generator 30 is connected to the DC bus 10 without intervention of the node connection switch 18 in the present embodiment, connection between the natural energy power generator 30 and the DC bus 10 can externally be controlled by a switch function of the power conditioner.

The load device 40 is, for example, a wireless device forming a communication network between the DC grid and the outside thereof or an LED illumination device. These load devices 40A and 40B are connected to the DC bus 10 through DC-DC converters 22A and 22B, respectively, and receive power supply from the DC bus 10.

The power storage device 50 includes two power storage devices 50A and 50B that can perform charge/discharge operation independently of each other. The power storage devices 50A and 50B each include a storage battery main body (battery cell) and a BMU (Storage battery Management Unit) for monitoring and controlling a charge state. The power storage devices 50A and 50B are connected to the DC bus 10 through bidirectional DC-DC converters 23A and 23B, respectively. When the power generated by the natural energy power generator 30 is larger than the power (load power) consumed by the load device 40, the power storage devices 50A and 50B are charged with the surplus of the generated power; while when the load power is larger than the generated power, the power storage devices 50A and 50B are discharged to supplement the deficiency of the load power. The power storage devices 50A and 50B preferably have substantially the same maximum capacity and charge/discharge performance. The BMU of each of the power storage devices 50A and 50B has an ON/OFF command reception function, a DC bus voltage regulation command reception function, a charge/discharge current amount regulation command reception function, a storage battery information transmission function, and the like and is configured to communicate with the power management apparatus 60. The storage battery charging rate of each of the power storage devices 50A and 50B is indicated by a SOC (State Of Charge: remaining capacity (Ah)/full charge capacity (Ah)×100), which is notified to the power management apparatus 60 as needed.

The DC power supply system 1 may further include a fuel power generation apparatus 35 such as a diesel generator. The fuel power generation apparatus 35 is activated when the power generated by the natural energy power generator 30 is low or activated on a scheduled basis at predetermined specific times or in a specific period of time to thereby forcibly increase the amount of power generation. This can avoid a regulation of load power and a blackout, allowing power to be stably supplied to the load device 40. Further, the fuel power generation apparatus 35 can be used as a power source for start-up of the DC power supply system 1. In general, the fuel power generation apparatus 35 such as a diesel generator generates an AC output and is thus connected to the DC bus 10 through an AC-DC converter 24.

The power management apparatus 60 is a computer system equipped with an EMS (Energy Management System). The power management apparatus 60 can remotely control input/output operations of the DC-DC converters 21 to 23 and control the amount of power generated by the natural energy power generator 30 and the power demand of the load device 40. To maintain the voltage on the DC bus 10, the power management apparatus 60 issues commands to the natural energy power generator 30, load device 40, and power storage device 50 and collects information from these devices. The command issuance and information collection are performed using a communication scheme such as RS-232C, RS-485, a CAN (Controller Area Network), Ethernet, Wi-Fi, or the like.

The power management apparatus 60 is provided with a starter device 70. The starter device 70 operates when the amount of power generated by the natural energy power generator 30 increases after the occurrence of a bus down due to power shortage to allow the system to restart. Although the starter device 70 is incorporated in the power management apparatus 60 in the present embodiment, it may be provided separately from the power management apparatus 60.

The starter device 70 makes the nodes 20 start up and connect to the DC bus 10 one by one in a preset order to thereby start up the entire DC grid. The starter device 70 transmits a diagnostic signal to a specific node to be diagnosed selected from among the plurality of nodes 20, before starting up the specific node, to check whether the node is operating normally.

In the present embodiment, the starter device 70 can supply start-up power to all the nodes 20, i.e., the solar power generator 30A, wind turbine generator 30B, fuel power generator 35, power storage devices 50A and 50B and load devices 40A and 40B. Further, the starter device 70 can supply a diagnostic signal to specific nodes 20, namely, the bidirectional DC-DC converter 23A for the power storage device 50A, bidirectional DC-DC converter 23B for the power storage device 50B, load device 40A, load device 40B, bidirectional DC-DC converter 22A for the load device 40A, and bidirectional DC-DC converter 22B for the load device 40B.

The diagnostic signal is supplied to the node 20 to be diagnosed through a start-up power supply line 11 for supplying the start-up power in general. The diagnostic signal may be individually supplied to the nodes 20, or common diagnostic signal may be selectively supplied to several nodes 20 through a relay switch or a semiconductor switch. In the latter case, switches 17 are controlled by a control signal from the power management apparatus 60 to select the nodes 20 to be diagnosed one by one. The switches 17 are connected to the power management apparatus 60 through a control signal line 12 and are configured to select the destination of the diagnostic signal.

Figure 2:
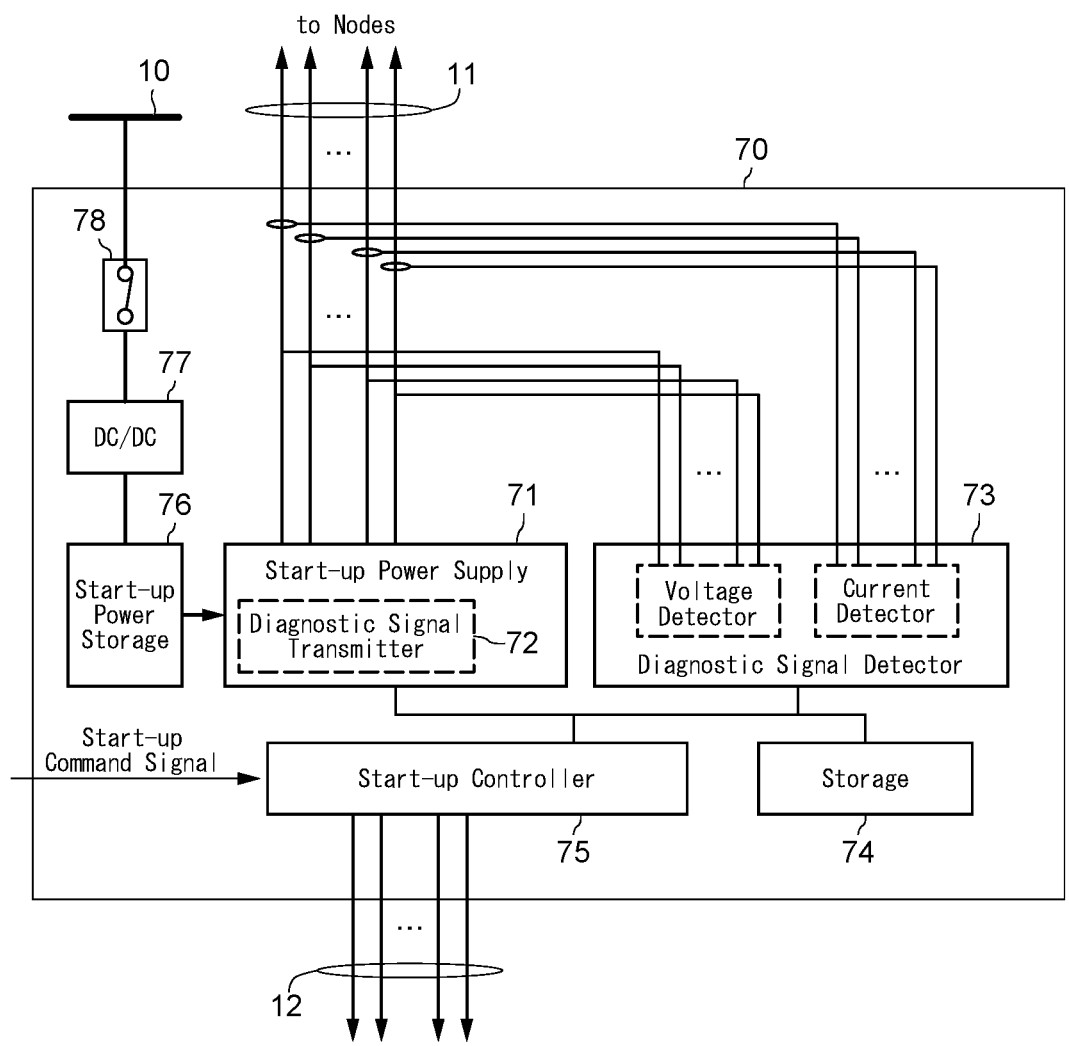
FIG. 2 is a block diagram illustrating the configuration of the starter device.

FIG. 2 is a block diagram illustrating the configuration of the starter device 70.

As illustrated in FIG. 2, the starter device 70 includes a start-up power supply 71 that supplies the start-up power to the nodes 20, a diagnostic signal transmitter 72 that supplies the diagnostic signal to the nodes 20, a diagnostic signal detector 73 that detects a response from the nodes 20 with respect to the diagnostic signal, a storage 74 that stores diagnostic results for the nodes 20, a start-up controller 75 that controls the components in the starter device 70, and a start-up power storage 76 that serves as a start-up power supply. The start-up power storage 76 is connected to the DC bus 10 through a DC-DC converter 77 and a switch 78.

The start-up power supply 71 supplies the start-up power to each node 20. As the start-up power, power stored in the start-up power storage 76 is used. After the restart of the DC grid, the nodes 20 receive power supply from the DC bus 10 and, accordingly, supply of the start-up power from the starter device 70 to the nodes 20 is stopped.

The diagnostic signal transmitter 72 constitutes a part of the start-up power supply 71 and supplies a pulse wave (rectangular wave) as the diagnostic signal to each node 20. That is, the diagnostic signal transmitter 72 supplies not a DC power but a pulse wave to the start-up power supply line 11.

The diagnostic signal detector 73 diagnoses the response current and voltage waveforms with respect to the diagnostic signal which is input to each node 20 through the start-up power supply line 11. Results of the diagnosis are stored in the storage 74.

The start-up controller 75 controls the components in the starter device 70 based on the diagnostic results. More specifically, when the node 20 is diagnosed to be normal, the start-up controller 75 outputs a control signal for controlling the node connection switch 18 and switch 17 to connect the node 20 to the DC bus and instructs the start-up power supply 71 to supply the start-up power to the node 20. On the other hand, when the node 20 is diagnosed to be abnormal, the start-up power supply 71 does not supply the start-up power, and the node connection switch 18 for connecting the node 20 to the DC bus 10 is kept in an OFF state. That is, the node 20 is excluded from those to be started up, and a state where the node 20 is disconnected from the DC bus 10 is kept.

The start-up power storage 76 is used as an initial power supply for activating the starter device 70 upon start-up of the system. The start-up power storage 76 can receive supply of power from the DC bus 10 through the DC-DC converter 77. The start-up power storage 76 is fully charged during normal operation of the DC power supply system 1 and, after that, it is disconnected from the DC bus 10 in preparation for a system down. That is, the switch 78 is normally in an OFF state. When the start-up controller 75 receives a start-up command signal indicating that the amount of power generated by the natural energy power generator 30 reaches a level allowing the restart of the DC grid, it starts starting up the nodes 20. The power management apparatus 60 has, for example, an illuminance sensor and indirectly monitors the power generation amount of the solar power generator 30A to determine whether the system can be restarted. Alternatively, the starter device 70 itself can determine whether the DC grid can be restarted by referring to an illuminance sensor provided in the starter device 70.

Thus, even when the DC bus 10 is down, the starter device 70 receives power supply from the start-up power storage 76 and operates with reduced power consumption while monitoring an input of the start-up command signal. In the bus down state, the node connection switches 18 for connecting the nodes 20 to the DC bus 10 are all in an off state.

When the power management apparatus 60 detects that the power generation amount of the solar power generator 30A reaches the system start-up level, it issues the start-up command signal to the starter device 70. Upon receiving the start-up command signal, the starter device 70 boosts the voltage on the DC bus 10 to a reference voltage (350 V) and makes the nodes 20 start up and connect to the DC bus 10 one by one in a preset order so as to start up the system. At this time, the operation of specific nodes (in this example, the power storage device 50 and load device 40) is checked before connection to the DC bus 10. In the operation check, when the node is diagnosed to be normal, it is connected to the DC bus 10, while when the node is diagnosed to be abnormal, it remains unconnected to the DC bus 10.

The specific nodes 20 may be diagnosed when a turn to be connected to the DC bus 10 comes, i.e., before supply of the start-up power, or may be diagnosed in advance, irrespective of the order of connection to the DC bus 10, after elapse of a predetermined period of time from the down of the DC bus 10. Thereafter, at the point in time when the power generation amount of the natural energy power generator 30 increases to allow the restart of the DC grid, the nodes 20 are connected to the DC bus 10 or made to remain unconnected thereto depending on the diagnostic results.

As described above, by diagnosing before connection to the DC bus 10 whether the specific nodes 20 operate normally, it is possible to avoid the occurrence of accidents due to immediate power transmission/reception between the nodes 20 and the DC bus 10.

Figure 3A:
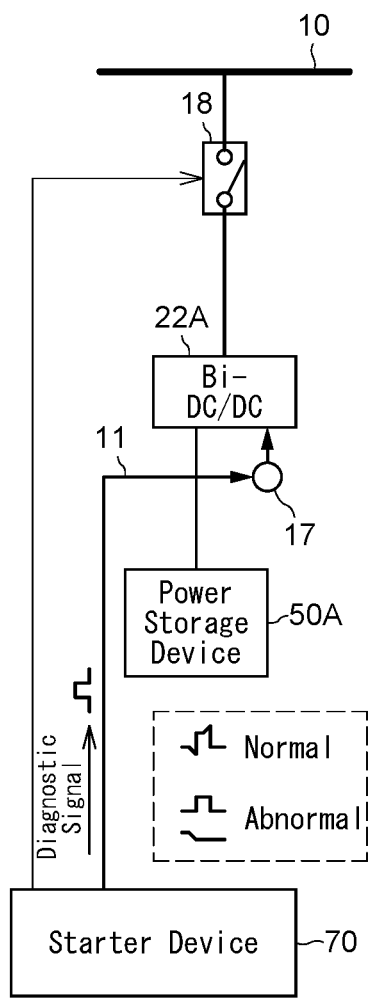
Figure 3B:
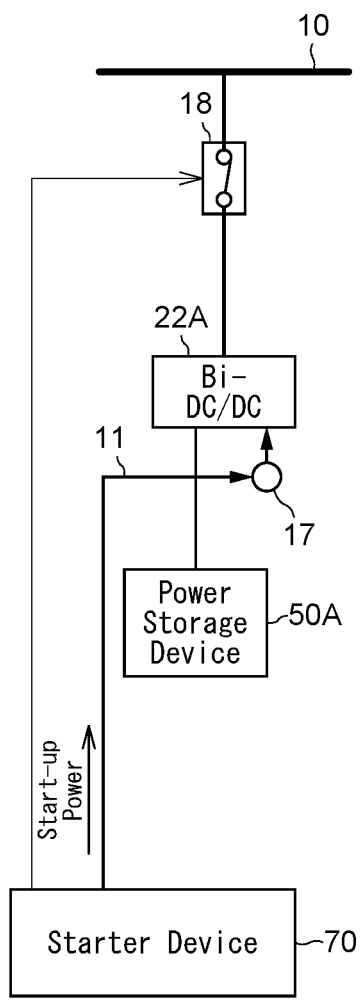

FIGS. 3A and 3B are views for explaining operation when the starter device 70 starts up the power storage device 50A. FIG. 3A illustrates an operation when the starter device 70 supplies the diagnostic signal to the power storage device 50A, and FIG. 3B illustrates an operation when the starter device 70 supplies the start-up power to the power storage device 50A.

When the power management apparatus 60 determines that the DC grid has shifted from a stop state to a restartable state, the starter device 70 starts the start-up processing of the DC grid. As illustrated in FIG. 3A, the starter device 70 that has started the start-up processing outputs the diagnostic signal on the start-up power supply line 11 which is connected to the power storage device 50A through the bidirectional DC-DC converter 23A. The diagnostic signal is, for example, a pulse wave (rectangular wave) of 12 V. Then, abnormality of the node is detected from the response current and voltage waveforms with respect to the diagnostic signal, i.e., a rise and a fall of the pulse voltage and a rise and a fall of the current upon start-up of the node. For example, the power storage device 50A is determined to be abnormal when a 12 V rectangular wave supplied to the power storage device 50A lowers to 10 V or less, or when a transient current, which normally shows 500 mA or less, becomes 1 A or more.

When the power storage device 50A is diagnosed to have no abnormality, the starter device 70 starts supplying the start-up power to the power storage device 50A and turns ON the node connection switch 18 to connect the power storage device 50A to the DC bus 10, as illustrated in FIG. 3B. On the other hand, when the power storage device 50A is diagnosed to have any abnormality, the starter device 70 does not supply the start-up power to the power storage device 50A and disconnects the power storage device 50A from the DC bus 10 with the node connection switch 18 kept in an OFF state.

As described above, the DC power supply system 1 according to the present embodiment has the starter device 70 configured to supply the start-up power to the plurality of nodes 20 and connect them to the DC bus 10 to start up the DC grid when the DC grid shifts from a stop state to a restartable state. The starter device 70 diagnoses the presence/absence of abnormality for specific ones of the plurality of nodes 20 before connection to the DC bus 10. Based on the results of the diagnosis, the starter device 70 connects normal nodes 20 to the DC bus 10 and does not connect abnormal nodes 20 to the DC bus 10. Thus, it is possible to safely connect the nodes 20 to the DC bus 10 upon start-up of the DC grid. Further, the diagnostic signal is supplied using the start-up power supply line 11 for use in starting up the nodes 20, allowing the specific nodes 20 to be diagnosed without use of a special device and a dedicated line.

While the preferred embodiments of the present invention have been described, the present invention is not limited to the above embodiments, and various modifications may be made within the scope of the present invention, and all such modifications are included in the present invention.

For example, the types and the numbers of the generators and devices are not particularly limited, and any numbers of any types of the generators and load devices may be provided in the system. Further, not specified nodes but all the nodes in the system may be diagnosed.

REFERENCE SIGNS LIST

1 DC power supply system
10 DC bus
12 control signal line
17 switch
18 node connection switch
20 node
21, 21A, 21B DC-DC converter
22, 22A, 22B DC-DC converter
23, 23A, 23B DC-DC converter (bidirectional DC-DC converter)
24 AC-DC converter
30 natural energy power generator
30A solar power generator
30B wind turbine generator
35 diesel generator
40, 40A, 40B load device
50, 50A, 50B power storage device
60 power management apparatus
70 starter device
71 start-up power supply
72 diagnostic signal transmitter
73 diagnostic signal detector
74 storage
75 start-up controller
76 start-up power storage
77 DC-DC converter
78 switch

The invention claimed is:

1. A DC power supply system comprising:
a DC bus serving as a bus bar for DC power supply;
a plurality of nodes configured to connect to the DC bus each through a node connection switch and constitute a DC grid together with the DC bus;
a power management apparatus that manages the power demand of the entire DC grid including the plurality of nodes; and
a starter device that makes the plurality of nodes start up and connect to the DC bus one by one in a preset order in a state where the DC bus is down to start up the entire DC grid including the DC bus,
wherein the starter device supplies start-up power through a start-up power supply line to start up the plurality of nodes and then controls the node connection switch to connect the plurality of nodes to the DC bus,
the starter device diagnoses at least one node to be diagnosed selected from among the plurality of nodes before supply of the start-up power to determine the presence/absence of abnormality from a response with respect to a diagnostic signal which is supplied to the node to be diagnosed through the start-up power supply line,
when the node to be diagnosed is determined to be normal, the starter device supplies the start-up power thereto and connects it to the DC bus, and
when the node to be diagnosed is determined to be abnormal, the starter device suspends supply of the start-up power and connection to the DC bus.

2. The DC power supply system according to claim 1, wherein the starter device includes a start-up power storage, and
the starter device receives power supply from the DC bus during activation of the DC bus to charge the start-up power storage, disconnects the start-up power storage from the DC bus in preparation for down of the DC bus, and uses the power that has been stored in the start-up power storage during the down of the DC bus for operation of the starter device and start-up of the plurality of nodes.

3. The DC power supply system according to claim 1, wherein the starter device starts the start-up of the plurality of nodes upon receiving a DC grid start-up command signal.

4. The DC power supply system according to claim 3, wherein the power management apparatus outputs the start-up command signal after detecting that the DC grid shifts from a stop state to a startable state.

5. The DC power supply system according to claim 1, wherein the starter device starts diagnosing the node to be diagnosed after elapse of a predetermined period of time from the down of the DC bus.

6. The DC power supply system according to claim 1, wherein the starter device notifies the power management apparatus of the results of the diagnosis for the nodes to be diagnosed.

7. The DC power supply system according to claim 1, wherein the plurality of nodes includes
a power generator including a natural energy power generator,
at least one power storage device connected to the DC bus through a bidirectional DC-DC converter, and
at least one load device,
the nodes to be diagnosed include at least the power storage device, and
the power management apparatus controls the DC grid including the bidirectional DC-DC converter such that it compares the amount of power generated by the power generator and the amount of power consumed by the load device, charges the power storage device with the surplus power when the power generation amount exceeds the power consumption amount, and discharges the power storage device to supplement the deficiency of power when the power consumption amount exceeds the power generation amount.

8. The DC power supply system according to claim 1, wherein the starter device is incorporated in the power management apparatus.

9. The DC power supply system according to claim 1, wherein the starter device is provided independently of the power management apparatus.

* * * * *